United States Patent [19]

Hallstrom, Jr.

[11] Patent Number: 4,691,819

[45] Date of Patent: Sep. 8, 1987

[54] RECIPROCATING CONVEYOR

[76] Inventor: Olof A. Hallstrom, Jr., 1920 Hallstrom Rd., Tillamook, Oreg. 97141

[21] Appl. No.: 598,164

[22] Filed: Apr. 9, 1984

[51] Int. Cl.⁴ .............................................. B65G 25/04
[52] U.S. Cl. ..................................................... 198/750
[58] Field of Search ............... 198/750, 773, 774, 775; 91/517, 519, 533

[56] References Cited

U.S. PATENT DOCUMENTS

4,143,760  3/1979  Hallstrom ........................... 198/775
4,241,824  12/1980  Georg et al. ......................... 198/745

Primary Examiner—Robert J. Spar
Assistant Examiner—D. Glenn Dayoan
Attorney, Agent, or Firm—Olson and Olson

[57] ABSTRACT

A plurality of elongated slats are arranged side by side to form an elongated conveyor, and they are connected to three transverse drive beams in such manner as to form the slats into a plurality of groups of three slats each. Each drive beam is connected to a pair of fluid pressure drive cylinders disposed on opposite sides of the beam so that as one cylinder pushes the beam the other cylinder pulls it. Control valves communicates the cylinders selectively to a source of fluid pressure to reciprocate the slats in a manner to effect moving a load supported thereon in a predetermined direction. The plurality of slats thus form a reciprocating conveyor which moves a load in one direction at a predetermined speed. In another embodiment, sequencing valves are added to prevent communication between the fluid pressure source and one cylinder of each pair until a predetermined elevated fluid pressure is achieved, so that at lower fluid pressure the slats are driven by one cylinder of each pair at a faster speed than when driven by both cylinders of each pair. In still another embodiment, a reversing valve is included to afford selection of load conveying movement in either of opposite directions.

9 Claims, 6 Drawing Figures

RECIPROCATING CONVEYOR

BACKGROUND OF THE INVENTION

This invention relates to reciprocating conveyors, and more particularly to a fluid pressure drive system for reciprocating conveyors of the slat type.

This invention represents a modification of the reciprocating conveyor described in my earilier U.S. Pat. No. 4,143,760. In said prior conveyor, each slat of a group of slats is reciprocated by a separate, single fluid pressure cylinder of a size selected to operate the conveyor for moving loads of a predetermined maximum weight. Although said earlier conveyor is quite adequate for most purposes, the present invention provides a reciprocating conveyor in which heavier loads are movable with smaller cylinders and in which the weight of the load may operate automatically to adjust the drive power and speed of movement of the conveyor.

SUMMARY OF THE INVENTION

In its basic concept, the reciprocating conveyor of this invention utilizes a pair of fluid pressure cylinders connected together on opposite sides of their connections to a reciprocating conveyor slat and coupled to a source of fluid pressure in such manner as to move the slat either by the combined power of both cylinders or at a greater speed by operation of only one of the pair of cylinders.

A principal object of this invention is the provision of a reciprocating conveyor of the class described which affords moving heavier loads with smaller fluid pressure cylinders.

Another object of this invention is to provide a reciprocating conveyor of the class described which affords moving lighter loads at greater speeds.

Still another object of this invention is the provision of a reciprocating conveyor of the class described which affords automatic selection of the power requirement for a load by sensing the resistance of the load to movement by the conveyor.

A further objective of this invention is the provision of reciprocating conveyor of the class described which is of simplified construction for economical manufacture, maintenance and repair.

The foregoing and other objects and advantages of this invention will appear from the following detailed description taken in connection with the accompanying drawings of preferred embodiments.

DESCRIPTION OF THE PREFERRED EMBODIMENTS

Figure 1:
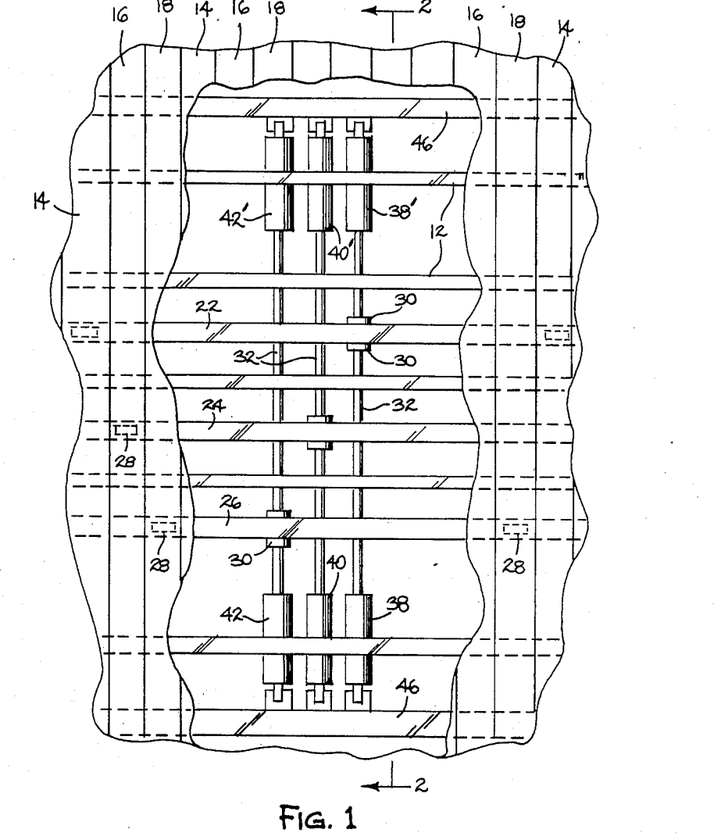
FIG. 1 is a fragmentary plan view of a reciprocating slat type conveyor embodying the features of this invention, a portion being broken away to disclose details of construction.

The reciprocating conveyor of this invention may be utilized per se in a variety of industrial applications, such as elongated delivery conveyors. It may also form the load supporting bed of a truck. in any event, the conveyor is supported by a framework which includes laterally spaced side beams 10 interconnected by transverse beams 12.

The illustrated preferred embodiment of the conveyor comprises at least one group of at least three elongated slats which extend longitudinally of the framework in the direction of load conveying movement and which are arranged side by side transversely of the framework. There are a plurality of such groups in the embodiment illustrated, each group consisting of three slats 14, 16 and 18, although it is to be understood that each group may include any desired number in excess of two.

Figure 2:
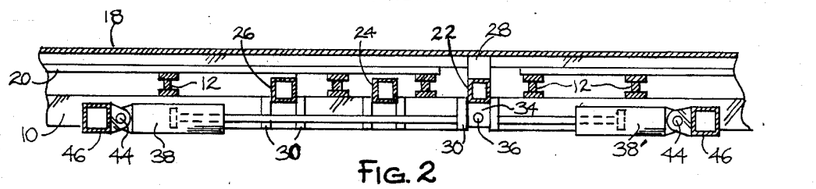
FIG. 2 is a fragmentary sectional view taken on the line 2—2 in FIG. 1.

Supported by the transverse frame beams 12 and extending longitudinally of the framework are a plurality of laterally spaced guide beams 20. They are secured to the transverse beams 12, as by welding. Each of the elongated conveyor slats is mounted ona guide beam 20 for longituidnal reciprocation relative thereto. This mounting may be provided by the structural arrangement described in detail in my U.S. Pat. No. 4,144,963 in order to minimize frictional resistance to said reciprocation.

In the preferred embodiment of this invention, fluid pressure drive mechanism is provided for reciprocating the slats of each group simultaneously from a start position in a load conveying direction and then to move the slats of each group sequentially in the opposite direction from the advanced position back to the start position. This mode of operation insures efficient movement of all types of loads in a desired conveying direction. It is to be understood, however, that the drive system may be arranged to provide the mode of operation described in my earilier U.S. Pat. No. 3,534,875 in which a majority of the slats of each group of at least three slats are always moved in the load conveying direction while the remaining slats of the group are moved in the retracting direction at a higher rate of speed.

In the embodiment illustrated, one slat of each group is interconnected for simultaneous longitudinal reciprocation. For this purpose, three transverse drive beams 22, 24 and 26 underlie the slats intermediate certain of the transverse frame beams 12 between which portions of the longitudinal guide beams 20 have been cut away (FIG. 2). Each drive beam is provided with a plurality of laterally spaced brackets 28 which extend upward through the cut away portions of the guide beams 20 for attachment to the associated slats. In the embodiment illustrated, a plurality of said brackets 28 on drive beam 22 secure all of the slats 14 of the plurality of groups together; a plurality of said brackets 28 on drive beam 24 secure all of the slats 16 together; and a plurality of said brackets 28 on drive beam 26 secure all of the slats 18 together.

Each of the transverse drive beams is connected to a source of fluid pressure power for reciprocative movement in the longitudinal direction of the conveyor. In the illustrated embodiment, each of the drive beams 22, 24 and 26 is provided with downwardly extending, longitudinally spaced flanges 30 which have aligned openings therein for receiving an intermediate portion of a piston rod 32. Laterally spaced flanges 34 (FIG. 2) secured to the flanges 30 mount an anchor pin 36 which extends through the piston rod 32. The piston rods thus are secured to the drive beams.

Each piston rod extends between a pair of fluid pressure cylinders 38, 38'; 40,40'; and 42,42'. The opposite ends of each psiton rod is secured to a piston which reciprocates in its cylinder upon the application of fluid pressure, preferably hydraulic, selectively to the opposite ends of the cylinder. The piston head, or base ends of the cylinders opposite the piston rods are shown mounted pivotally, as by pivot pins 44, to transverse frame members 46 secured at their opposite ends to the side beams 10 of the framework. The rods may be secured rigidly to the frame members 46, if desired.

The cylinder pairs are positioned on opposite sides of their respective drive beams, and hence on opposite sides of their connections to the slats. In this manner one cylinder of each pair functions to push the associated drive beam and slats while the other cylinder of the pair pulls. This arrangement provides maximum efficiency of power utilization.

Figure 3:
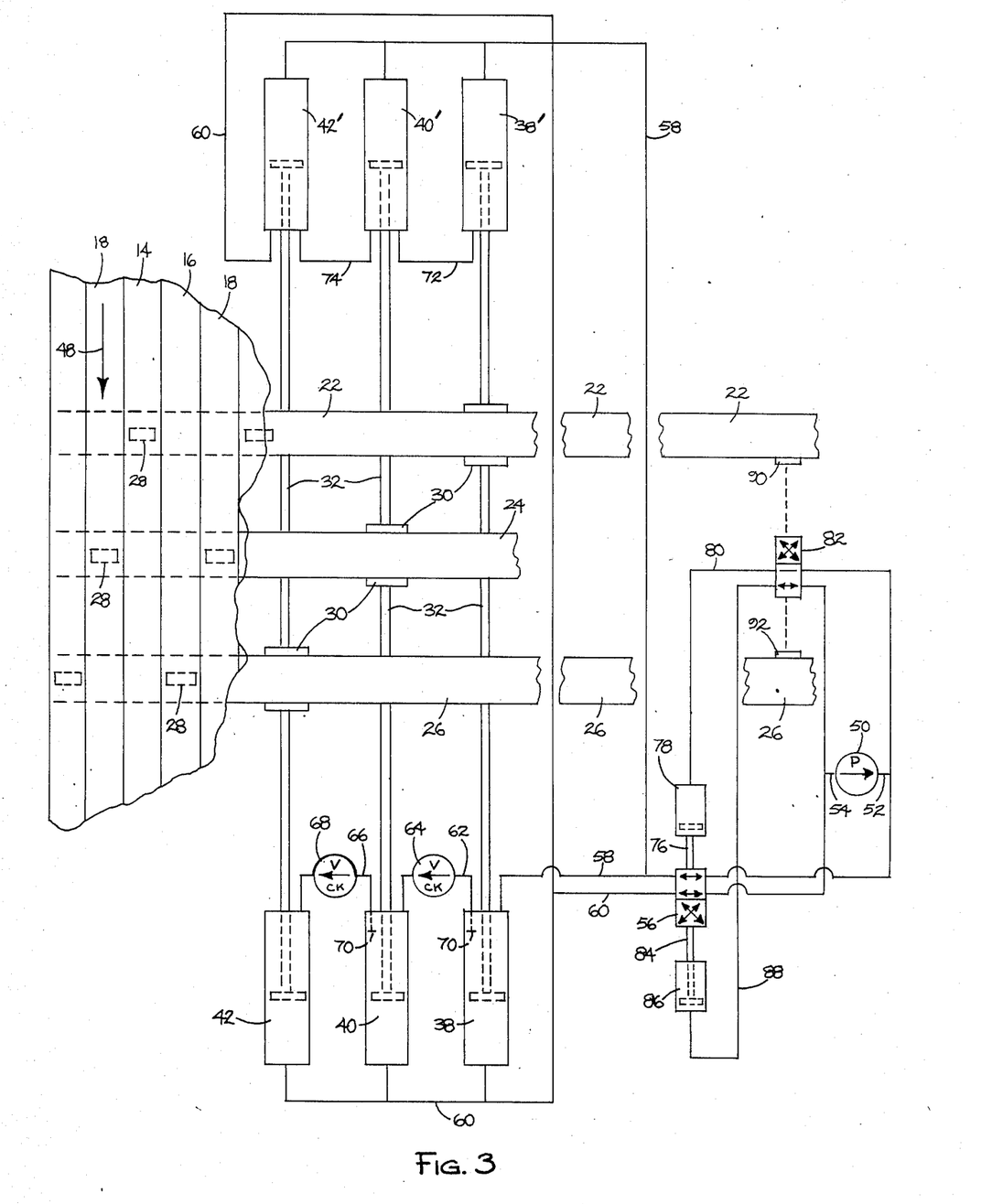
FIG. 3 is a fragmentary plan view of the conveyor of FIG. 1 showing in schematic diagram form a fluid pressure drive system embodying the features of this invention and arranged to provide drive power by both cylinders of each pair.

Referring now to FIG. 3 of the drawings, there is illustrated a fluid pressure system associated with the cylinders for effecting selective reciprocation of the pistons and piston rods to provide load conveying movement of the slats in the direction indicated by the arrow 48. This system includes a fluid pressure pump 50, preferably hydraulic, provided with outfeed conduit 52 and exhaust, or return conduit 54. A switching valve 56 functions to communicate said conduits interchangeably with conduits 58 and 60.

Conduits 58 communicate with the piston rod end of cylinder 38 and with the base end of the cylinders 38', 40' and 42'. Conduits 60 communicate with the base ends of each of the cylinders 38, 40 and 42 and with the piston rod end of cylinder 42'.

The piston rod end of cylinder 38 communicates with the piston rod end of cylinder 40 through conduit 62 and check valve 64. In similar manner, the piston rod end of cylinder 40 communicates with the piston rod end of cylinder 42 through conduit 66 and check valve 68. The check valves prevent fluid pressure flow in the direction opposite the flow direction indicated by the associated arrows until the piston rods 32 of the cylinders 38 and 40 become fully extended. Once fully extended, the associated piston engages a check valve operator 70 within the associated cylinder to switch the check valve to allow bidirectional flow.

The piston rod ends of cylinders 38', 40' and 42' communicate freely with each other through conduits 72 and 74.

As illustrated, the body of switching valve 56 is connected at one end to the piston rod 76 of a fluid pressure cylinder 78. The end of cylinder 78 opposite the piston rod is connected by conduit 80 and switching valve 82 to the outlet conduit 52 of the fluid pressure pump 50.

In similar manner, the body of the switching valve 56 is connected at the end opposite cylinder 78 to the piston rod 84 of a fluid pressure cylinder 86. The end of this cylinder opposite its piston rod is connected by conduit 88 and switching valve 82 to the return conduit 54 of pump 50.

Switching valve 82 is positioned for selective acutation by drive beams 22 and 26. As illustrated, the valve is mounted adjustably in a position below the plane of reciprocation of the drive beams. Arms 90 and 92 depend from beams 22 and 26, respectively, to engage the opposite ends of the valve 82 as the beams approach one of their limits of reciprocative movement. Thus, when beam 22 reaches its limit of movement in the load conveying direction 48, arm 90 will have engaged valve 82 and moved it to its alternate position of adjustment. Conversely, when beam 26 reaches its limit of movement in the retracting direcion (opposite direction 48), arm 92 will have engaged switch 82 and moved it back to the position illustrated in FIG. 3.

In the position of the components illustrate in FIG. 3, drive beam 26 has just previously switched valve 82 to the position illustrated to allow pressurization of cylinder 78 from pump 50, to effect switching to valve 56 to the position illustrated. In this position of the valve, fluid pressure from pump 50 is directed through conduit 58 to the base ends of cylinders 38', 40' and 42' and to the piston rod end of cylinder 38 to initiate retraction of its associated piston rod and drive beam 22. Simultaneously, fluid pressure from conduit 58 passes through conduit 62 and check valve 64 into the piston rod end of cylinder 40 and thence through conduit 66 and check valve 68 into the piston rod end of cylinder 42.

By virtue of the foregoing sequence, all of the drive beams 22, 24 and 26 move substantially simultaneously in the same direction, i.e. in the direction of simultaneous retraction of piston rods 32 into the cylinders 38, 40 and 42 and extension of the piston rods 32 from the cylinders 38', 40', and 42'. This results in simultaneous movement of all of the slats in the load conveying direction 48.

Movement of all three drive beams and the associated elongated slats simultaneously in the conveying direction continues until all of the slats have been moved to their advanced position. Also, the arm 90 on drive beam 22 has engaged and moved the valve 82 from the position illustrated to its alternate position, whereby to shift switching valve 56 from the position illustrated to its alternate position.

In the switched position of valve 56, fluid pressure from pump 50 is communicated through conduits 60 to the base ends of cylinders 38, 40 and 42 and to the piston rod ends cylinders 38', 40' and 42'. Conduits 58 communicate the base ends of cylinders 38', 40' and 42' and the piston rod end of cylinder 38 with the exhaust side of the pump. Since the piston rod ends of clyindrs 40 and 42 are closed by chech valves 64 and 68, only the piston rod 32 of cylinder 38 is caused to extend.

Upon reaching its maximum limit of extension, the piston of cylinder 38 engages the operator 70 of check valve 64, switching the latter to allow fluid pressure flow from the piston rod end of cylinder 40 through conduit 62, check valves 64 and conduit 58, back to the exhaust side 54 of the pump. The piston rod associated with cylinder 40 thus is caused to extend.

Upon reaching its limit of extension, the piston of cylinder 40 engages the operator 70 of check valve 68, switching the latter to allow fluid flow from the piston rod end of cylinder 42 through conduit 66 and check valve 68, thence through conduit 62 and check valve 64, through conduit 58 to the exhaust side of the pump. The piston rod of cylinder 42 thus is causes to extend.

Upon reaching its limit of full extension, the piston rod of cylinder 42 will have moved the arm 92 on drive beam 26 into operative engagement with valve 82, switching the lattr to communicate pump 50 with cylinder 78 to effect transfer of switching valve 56 once again to the position illustrated in FIG. 3. This position functions to effect simultaneous retraction of all piston rods 32 and consequent movement of all of the slats simultaneously in the load conveying direction 48.

It is to be noted that the foregoing movement of the drive beams, and hence the conveyor slats in the load conveying direction and in the opposite, retracting direction, is effected by the combined power of the pairs of cylinders 38, 38' 40,40'; and 42,42'. The size of the cylinders may be reduced in comparison with the cylinder size of my earlier conveyor described in U.S. Pat. No. 4,143,760 since the cylinders of this invention operate in pairs.

Thus, if the volume output of pump 50 is the same as the pump in my earlier conveyor and the effective area of each cylinder pair is the same as the corresponding single cylinder of my earlier conveyor, the speed and drive power of reciprocation of the slats will be the same. However, the application of power is more effective with the cylinder pairs of this invention, since one cylinder pulls the load while the other pushes it. Accordingly, the cylinders and piston rods may be sized in minimum dimensions.

Figure 4:
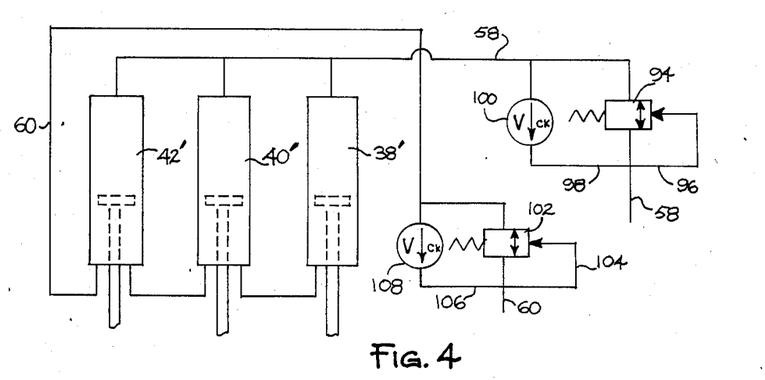
FIG. 4 is a fragmentary schematic diagram showing a modification of the fluid pressure drive system of FIG. 3 by which the weight of the load controls automatically the power and speed of the drive system.

The foregoing reduction in size of cylinders also enables the modification of FIG. 4 to control automatically the speed of movement of the slats according to the weight of the load to be conveyed. For this purpose, there is interposed in conduit 58 between the switching valve 56 and the base ends of the cylinders 38', 40' and 42' an adjustable sequencing valve 94. Fluid pressure from conduit 58 is supplied to this valve by conduit 96.

The valve 94 is moved from its closed position illustrated in FIG. 4 to its alternate position opening conduit 58, when the pressure of the fluid in conduit 58 reaches a predetermined elevated magnitude, for example 2000 psi. It will be understood, however, that the valve 94 may be adjusted to open at any desired pressure.

A conduit 98 with check valve 100 bypasses the sequencing valve 94 to provide fluid return in the direction of the arrow.

In similar manner, sequencing valve 102 is interposed in conduits 60 between switching valve 56 and the piston rod end of cylinder 42'. It is supplied with fluid pressure from conduits 60 by conduit 104. Also, conduit 106 and check valve 108 bypass the valve to allow fluid return in the direction of the arrow.

In the operation of the modified system of FIG. 4, the mode is identical to FIG. 3 if the fluid pressure is sufficient to open the sequencing valves 94 and 102. This is achieved when the weight of the load on the conveyor slats provides sufficient resistance to movement of the slats as to cause the fluid pressure to rise at least to the magnitude preset to open the sequencing valve.

On the other hand, if the weight of the load is sufficiently light as to cause the fluid pressure to be reduced below the preset magnitude, the sequencing valves will close. Accordingly, the cylinders 38', 40' and 42' are blocked from the fluid pressure system and do not assist the cylinders 38, 40 and 42 in moving the load. Since the fluid pressure now is applied to only one of the two cylinders of each pair, the volume of fluid pressure from the pump being constant, the pistons in the operations cylinders are moved at twice the speed as when the fluid pressure is applied to both cylinders of each pair.

Accordingly, the conveyor slats are caused to reciprocate faster or slower, automatically as the weight of the load is sensed by change in fluid pressure at the sequencing valves.

Figure 5:
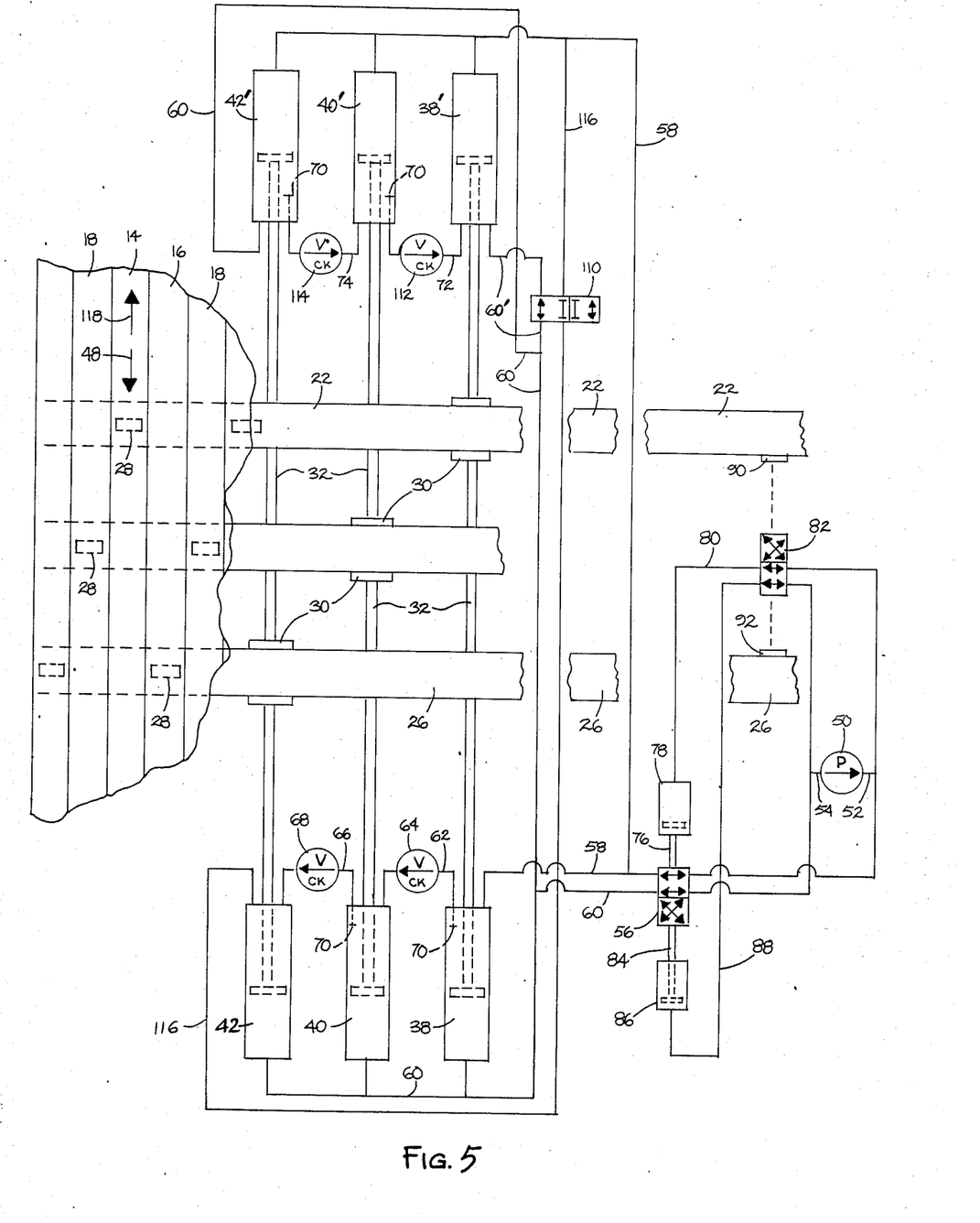
FIG. 5 is a fragmentary plan view similar to FIG. 3 showing in schematic diagram form a modification of the fluid pressure drive system of FIG. 3 arranged to provide reversible drive power for moving a load selectively in either direction of movement of the conveyor slats.

The fluid pressure system illustrated in FIG. 5 accommodates reversal of the direction of load conveying movement of the slats. For this purpose the fluid pressure system illustrated in FIG. 3 is modified as follows:

The conduit 60 from switching valve 56 is coupled through conduit 60' and manual reversing valve 110 to the piston rod end of cylinder 38'. The piston rod ends of cylinders 38' and 40' are interconnected by conduit 72 and check valve 112. Similarly, the piston rod ends of cylinders 40' and 42' are interconnected by conduit 74 and check valve 114. Also, conduit 116 interconnects the piston rod end of cylinder 42 and the base ends of the cylinders 38', 40' and 42' through the manual reversing valve 110.

In the illustrated position of switching valve 56 and reversing valve 110, fluid pressure from pump 50 is applied through conduits 58 to the base ends of cylinders 38', 40' and 42' and to the piston rod end of cylinder 38, as in FIG. 3. Since the reversing valve 110 closes the conduit 116, the drive beams 22, 24 and 26 move simultaneously in the load conveying direction 48 of FIG. 3. When the switching valve 56 is moved to its alternate position, the drive beams are moved in the retracting direction sequentially, as previously described.

When manual reversing valve 110 is moved to its alternate position, and with switching valve 56 positioned as illustrated in FIG. 5, fluid pressure from pump 50 is applied through conduits 60 to the base ends of cylinders 38, 40 and 42 and to the piston rod end of cylinder 42' and thence through check valves 114 and 112 to the piston rod ends of cylinders 40' and 38'. Thus, all of the piston rods 32, drive beams 22, 24 and 26 and slats 14, 16 and 18 are moved simultaneously in the load conveying direction of arrow 118. Fluid return to the tank side of pump 50 is afforded by conduits 58.

Figure 6:
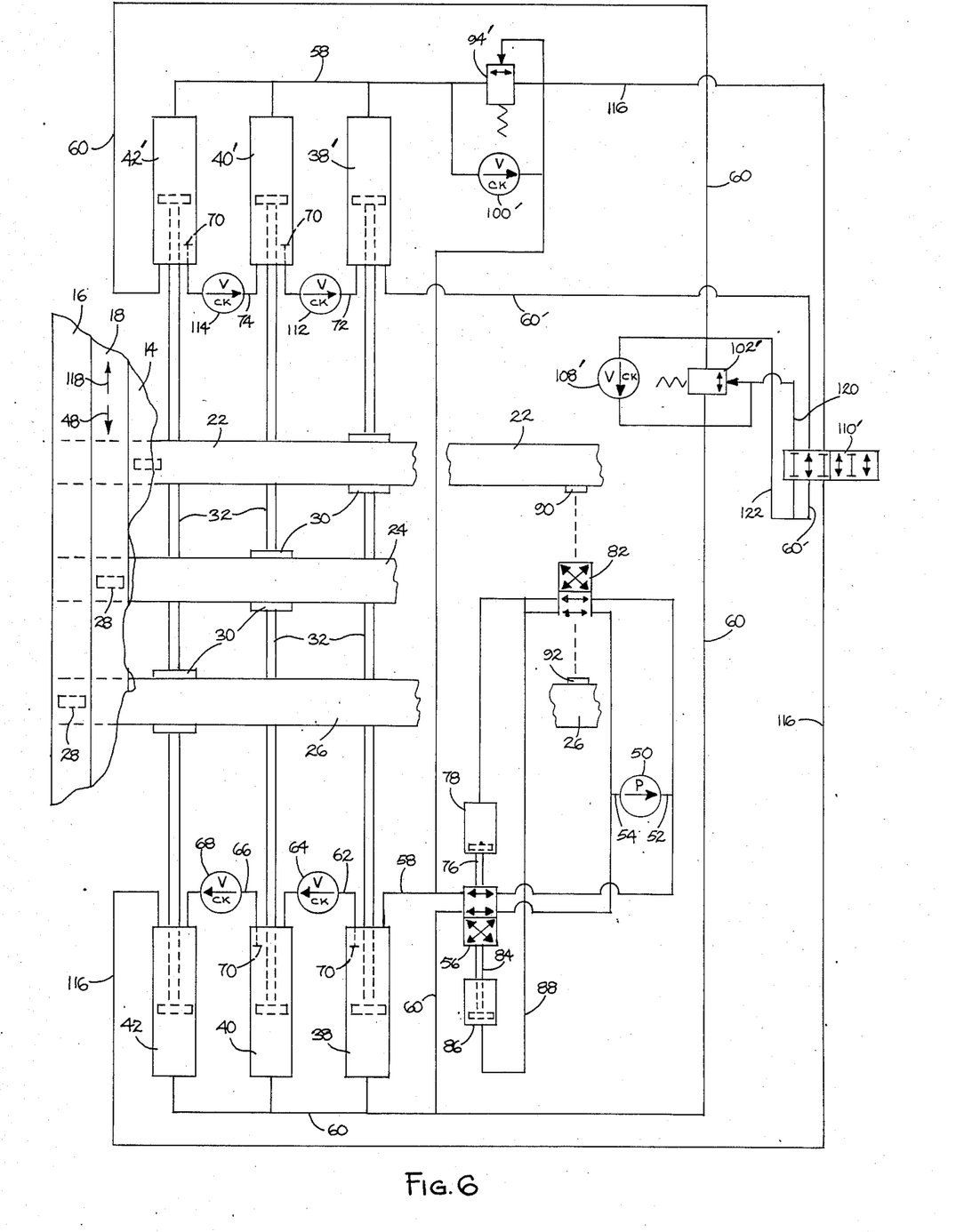
FIG. 6 is a fragmentary plan view showing in schematic diagram form a modification of the fluid pressure drive system of FIG. 5 by which the weight of a load controls automatically the power and speed of the reversible drive system of FIG. 5.

The fluid pressure system illustrated in FIG. 6 affords automatic control of speed of movement of the slats, as in FIG. 4, while also accommodating reversal of direction of load conveying movement of the slats, as in FIG. 5.

Thus, with the switching valve 56 and reversing valve 110' in the positions shown in FIG. 6, fluid pressure is applied to the rod ends of cylinders 38, 40 and 42, and the base ends of the cylinders are exhausted through conduit 60. Fluid pressure also is delivered to the base ends of cylinders 38', 40' and 42', provided the load on the slats in heavy enough to raise the fluid pressure to the pressure required to open the sequence valve 94'. In that event, the rod ends of the latter cylinders are exhausted through conduit 60', reversing valve 110' and conduits 60' and 122, check valve 108' and conduit 60. The load thus is moved in the direction of arrow 48 at the slower rate of speed resulting from operation of both cylinders of each pair.

If the load on the slats is so light that the fluid pressure is not raised to the magnitude required to activate the sequence valve 94', the cylinders 38', 40' and 42' are not pressurized to assist the companion cylinders. Accordingly, the load will be moved in the direction of arrow 48 at the faster rate of speed resulting from pressurization of only the one cylinder of each pair.

When all of the slats reach their limit of movement in the load conveying direction, arm 90 will have moved the valve 82 to its alternate position to effect pressurization of cylindr 86 and movement of the switching valve 56 to the alternate position. Thus, fluid pressure is applied through conduit 60 to the base ends of cylinders 38, 40 and 42. The rod ends of these cylinders are exhausted sequentially through conduit 58, whereby the slats are sequenced back to the start position. In the event the fluid pressure is sufficiently high to open sequence valve 102', the rod ends of cylinders 42', 40' and 38' are pressurized to assist in retracting the slats. In such event, the base ends of the assisting cylinders are exhausted through check valve 100' and conduit 58.

In the event the fluid pressure is insufficient to open sequencing valve 102', the cylinders 38', 40' and 42' are not pressurized. The sequential retraction of the slats thus is effected solely by the cylinders 38, 40 and 42, at the faster rate of speed.

Let it now be assumed that the reversing valve 110' is moved to the alternate position from the position illustrated in FIG. 6. With the switching valve 56 in the position shown in FIG. 6, fluid pressure is applied to the rod ends of cylinders 38, 40 and 42, with the base ends there being exhausted through conduit 60. If the fluid pressure is sufficiently high to open sequence valve 94', fluid pressure is applied to the base ends of cylinders 38', 40' and 42'. The rod ends of these cylinders are exhausted sequentially (42', 40', 38') through conduits 60 and 122, reversing valve 110' and conduits 120 and 60, to effect slow sequencing of the slats in the direction of arrow 48. If the fluid pressure is insufficient to open sequence valve 94', the cylinders 38', 40' and 42' are not pressurized and therefore the sequencing is effected solely by the cylinders 38, 40 and 42, at the faster rate.

Upon completion of the sequencing operation, switching valve 56 will have been moved to its alternate position to cause pressurization of the base ends of the cylinders 38, 40 and 42 through conduit 60, the rod ends of these cylinders being exhausted simultaneously through conduit 116, reversing valve 110' and conduits 116 and conduit 58.

Simultaneously with the pressurization of the base ends of the cylinders 38, 40 and 42, the rod ends of cylinders 38', 40' and 42' are pressurized through conduits 60 and 120, reversing valve 110' and conduits 122 and 60. The base ends of these cylinders are exhausted through check valve 100' and conduit 58. Accordingly, all of the slats are moved in the load conveying direction of arrow 118.

It will be apparent to those skilled in the art that various changes may be made in size, shape, type, number and arrangement of parts described hereinbefore. For example, each cylinder of a pair can have its own separate piston rod 32, with both rods connected to the same drive beam or associated slat. In any case, the cylinders of each pair are controlled in such manner as to cause one to extend and the other to contract simultaneously. This and other changes may be made, as desired, without departing from the spirit of this invention and the scope of the appended claims.

I claim:

1. A reciprocating conveyor, comprising:
   (a) a frame,
   (b) a plurality of elongated slat members mounted adjacent each other on the frame for independent longitudinal reciprocation,
   (c) a plurality of pairs of longitudinally spaced, longitudinally reciprocative fluid pressure drive cylinders, one pair for each slat member, each drive cylinder including a piston component and a cylinder component,
   (d) means mounting one component of said drive cylinders of each pair on the frame and enabling reciprocation of the other component of said drive cylinders of each pair,
   (e) means connecting the confronting ends of said other components of each pair of said drive cylinders operatively to the associated slat member with said drive cylinders of the pair extending in opposite directions from said connection,
   (f) a source of fluid pressure for reciprocating said other components of said drive cylinders,
   (g) fluid pressure control means communicating the source of fluid pressure to the drive cylinders selectively to effect simultaneous extension of said other component of said one drive cylinder of a pair and contraction of said other component of said other drive cylinder of the pair and to reciprocate said other components of said drive cylinders in a manner to effect reciprocation of the slat members in a load conveying direction and in a retracting direction, and
   (h) sequencing valve means interposed between the fluid pressure source and one of said drive cylinders of each pair of said drive cylinders for opening and closing communication between said fluid pressure source and said drive cylinder, the sequencing valve means being operable at a predetermined fluid pressure to open said communication for applying fluid pressure to both of said drive cylinders of the pair and operable at a predetermined lower fluid pressure to close said communication for applying fluid pressure only to the other drive cylinder of the pair.

2. The reciprocating conveyor of claim 1 wherein the fluid pressure control means is operable when all of the slat members reach their limit of movement in the load conveying direction to effect reversing the plurality of said drive cylinder pairs one at a time for retracting the slat members one at a time back to a start position, and operable when all of the slat members reach their limit of movement in the retracting direction to effect reversig the plurality of said drive cylinder pairs simultaneously for moving all of the slat members simultaneously in the load conveying direction.

3. The reciprocating conveyor of claim 1 including reversing valve means interposed between the source of fluid pressure and the drive cylinder pairs and operable in alternate positions of adjustment to effect load conveying movement of the slat members in opposite directions.

4. The reciprocating conveyor of claim 1 wherein:
   (a) the pluralty of slat members are arranged in a plurality of groups of at least three slat members each.
   (b) a plurality of drive beam members each interconnects a different one of the slat members of each group and extend substantially normal in the longitudinal direction of the slat members,
   (c) each drive beam being connected to said other components of one pair of said fluid pressure drive cylinders with said other components of said drive cylinders of the pair extending in opposite directions from the associated drive eam, and (d) the fluid pressure control means includes a switchig valve operable in one position of adjustment to communicate the source of fluid pressure with the outwardly facing ends of one of said drive cylinders of each pair located on one side of the associated drive beam and with the inwardly facing end of one of the drive cylinders located on the other side of the associated drive beam, check valve means communicating the inwardly facing ends of the other drive cylinders located on said other side of the associated drive beam with each other and with said one drive cylinder to allow flow of fluid pressure only from said one drive cylinder to the other drive cylinders in series, and check valve operator means for opening said check valve means for bidirectional fluid flow upon full extension of the associated component of said drive cylinder, the switching valve means being operable in a second position of adjustment to communicate the souce of fluid pressure with the outwardly facing ends of the drive cylinders located on said other side of the associated drive beams and with the inwardly facing end of one dirve cylinder located on said one side of the associated drive beam, the inwardly facing ends of the other drive cylinders located on said one side of the associated drive beams communicating freely with said one drive cylinder.

5. The reciprocating conveyor of claim 4 including reversing valve means interposed between the outwardly facing end of the drive cylinders on said one side of the drive beams and the inwardly facing end of the last drive cylinder of the series on the other side of the drive beam and between the outwardly facing ends of the drive cylinders on said other side of the drive beams and the inwardly facing end of the last drive cylinder of the series on said one side of the drive beam, the reversing valve means being operable in alternate positions of adjustment to reverse the direction of load conveying movement of the slat members.

6. The reciprocating conveyor of claim 4 including first sequencing valve means interposed between the switching valve and the outwardly facing ends of the drive cylinders located on said one side of the associated drive beams and operable to open communication therebetween when the fluid pressure rises to a predetermined magnitude, whereby to apply increased fluid pressure to said outwardly facing ends of the drive cylinders, and check valve means arranged to bypass said first sequencing valve means for returning fluid to exhaust.

7. The reciprocating conveyor of claim 6 including second sequencing valve means interposed between the switching valve and the inwardly facing end of said one drive cylinder located on said one side of the associated drive beam and operable to open communication therebetween when the fluid pressure rises to a predetermined magnitude, whereby to apply increased fluid pressure to said inwardly facing end of said one drive cylinder, and check valve means arranged to bypass said second sequencing valve means for returning fluid to exhaust.

8. The reciprocating conveyor of claim 7 including reversing valve means interposed between the outwardly facing ends of the drive cylinders on said one side of the drive beams and the inwardly facing end of the last drive cylinder of the series on the other side of the drive beam and between the outwardly facing ends of the drive cylinders on said other side of the drive beams and the inwardly facing end of the last drive cylinder of the series on said one side of the drive beam, the reversing valve means being operable in alternate positions of adjustment to reverse the direction of load conveying movement of the slat members.

9. A reciprocting conveyor comprising:
(a) a frame,
(b) a plurality of elongated slat members mounted adjacent each other on the frame for independent longitudinal reciprocation,
(c) a plurality of transverse drive members mounted on the frame intermediate the ends of the slat members for reciprocation in the longitudinal direction of the slat members, each drive member being secured to a different group of slat members,
(d) a plurality of pairs of longitudinally spaced, longitudinally reciprocative fluid pressure drive cylinders, one pair for each drive member, each drive cylinder including a piston component and a cylinder component,
(e) means mounting one component of said drive cylinders of each pair on the frame and enabling reciprocation of the other component of said drive cylinders of each pair,
(f) a common connector interconnecting the confronting ends of said other components of each pair of said drive cylinders and connected intermediate its ends to a different one of the transverse drive members with said drive cylinders of the pair extending in opposite directions from said connection,
(g) a source of fluid pressure for reciprocating said other components of said drive cylinders, and
(h) fluid pressure control means communicating the source of fluid pressure to the drive cylinders selectively to effect simultaneous extension of said other component of one drive cylinder of a pair and contraction of said other component of the other drive cylinder of the pair, whereby one drive cylinder of a pair operates to push the associated slat members while the other drive cylinder of the pair operates to pull the associated slat members, and to reciprocate said other components of said drive cylinders in a manner to effect reciprocation of the slat members in a load conveying direction and in a retracting direction.

* * * * *

UNITED STATES PATENT AND TRADEMARK OFFICE
CERTIFICATE OF CORRECTION

PATENT NO. : 4,691,819
DATED : 8 September 1987
INVENTOR(S) : Olof A. Hallstrom, Jr.

It is certified that error appears in the above-identified patent and that said Letters Patent are hereby corrected as shown below:

Column 2, line 35 "ona" should read -- on a --.
Column 4, line 21 "illustrate" should read -- illustrated --, Column 5, line 4 "causes" should read -- caused --,
          line 8 "lattr" should read -- latter --.
Column 6, line 3 "operations" should read -- operating --,
          line 53 "applied" should read -- supplied --.
Column 7, line 7 "cylindr" should read -- cylinder --,
          line 8 "applied" should read -- supplied --.
Column 8, line 60 "pluralty" should read -- plurality --.
Column 9, line 3 "eam" should read -- beam --,
          line 5 "switchig" should read -- switching --.
Column 10, line 18 "reciprocting" should read -- reciprocating --.

Signed and Sealed this

Third Day of May, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,691,819

DATED : September 8, 1987

INVENTOR(S) : Olof A. Hallstrom, Jr.

It is certified that error appears in the above-identified patent and that said Letters Patent is hereby corrected as shown below:

Column 4, line 24, "to", second occurrence, should read -- of --.

Signed and Sealed this

Sixteenth Day of August, 1988

Attest:

DONALD J. QUIGG

Attesting Officer

Commissioner of Patents and Trademarks